(12) United States Patent
Gupta et al.

(10) Patent No.: US 8,947,783 B2
(45) Date of Patent: Feb. 3, 2015

(54) OPTICAL COMBINER FOR NEAR-EYE DISPLAY

(71) Applicant: Google Inc., Mountain View, CA (US)

(72) Inventors: Anurag Gupta, Los Gatos, CA (US); Chia-Jean Wang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 13/732,688

(22) Filed: Jan. 2, 2013

(65) Prior Publication Data

US 2014/0185142 A1    Jul. 3, 2014

(51) Int. Cl.
*G02B 27/14* (2006.01)
*G02B 27/01* (2006.01)

(52) U.S. Cl.
CPC .................................. *G02B 27/017* (2013.01)
USPC ........................................................ 359/630

(58) Field of Classification Search
USPC ........................................................ 359/630
See application file for complete search history.

(56) References Cited

U.S. PATENT DOCUMENTS

| | | |
|---|---|---|
| 5,050,966 A | 9/1991 | Berman |
| 5,710,668 A | 1/1998 | Gohman et al. |
| 6,111,701 A | 8/2000 | Brown |
| 2007/0002412 A1 | 1/2007 | Aihara |
| 2007/0188837 A1* | 8/2007 | Shimizu et al. .................. 359/13 |
| 2009/0067057 A1* | 3/2009 | Sprague et al. ............... 359/630 |
| 2011/0109528 A1 | 5/2011 | Mun et al. |
| 2012/0249797 A1 | 10/2012 | Haddick et al. |

FOREIGN PATENT DOCUMENTS

| | | |
|---|---|---|
| JP | 2006-349719 A | 12/2006 |
| KR | 2011-0050929 A | 5/2011 |

OTHER PUBLICATIONS

PCT/US2013/074177—PCT International Search Report and Written Opinion, mailed Mar. 24, 2014 (10 pages).

* cited by examiner

*Primary Examiner* — James Jones
(74) *Attorney, Agent, or Firm* — Blakely Sokoloff; Taylor & Zafman LLP

(57) ABSTRACT

An optical combiner includes a first, second, and third color combiner layer ("CCL"). The first CCL includes a first diffractive grating coated with a first filter configured to reflect a first color light and pass a second and a third color light. The second CCL includes a second diffractive grating coated with a second filter configured to reflect the second color light and pass the third color light. The third CCL includes a third diffractive grating coated with a third filter configured to partially reflect visible light. The diffractive gratings are each embedded in an index matched material and are angle-tuned diffractive gratings configured to receive image light at an angle and respectively reflect the first, second, and third color light in the image light at an order of diffraction that directs the light to an eye of a user.

20 Claims, 4 Drawing Sheets

OPTICAL COMBINER FOR NEAR-EYE DISPLAY

TECHNICAL FIELD

This disclosure relates generally to optics, and in particular but not exclusively, relates to near-eye displays.

BACKGROUND INFORMATION

In the field of optics, a combiner is an optical apparatus that combines two images together, from either the same side of the combiner (reflective/reflective), or transmissive/transmissive) or from the two different sides of the combiner (reflective/transmissive). Often times, optical combiners are used in heads up displays ("HUDs"), which allow a user to view a computer generated image ("CGI") superimposed over an external view. The HUD enables the user to view the CGI without having to look away from her usual viewpoint. The term HUD originated from its use in avionics, which enabled a pilot to view information while looking forward with his head up, as opposed to looking down at cockpit instruments. Some conventional HUDs include holographic combiners and angled transparent substrates.

However, holographic combiners have a number of drawbacks. They are expensive to fabricate, difficult to mass produce, and have limited life spans (e.g., begin to degrade due to temperature, humidity, pressure and other harsh environmental conditions).

Angled transparent substrate combiners have been used in automobiles to present the driver with HUD information on the windshield. These optical combiners are made of a clear see-through substrate upon which an external image source displays the CGI. However, since the clear see-through substrate is typically a flat substrate without optical power so as not to distort the external FOV, the clear substrate must be angled (e.g. near 45 degrees) and bulky external magnification lenses are used to expand the CGI over the display region. The bulky external lenses and angled nature of the clear see-through substrate combiners do not lend themselves well to compact arrangements, such as head mounted displays ("HMDs").

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and system of optical combining images for are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
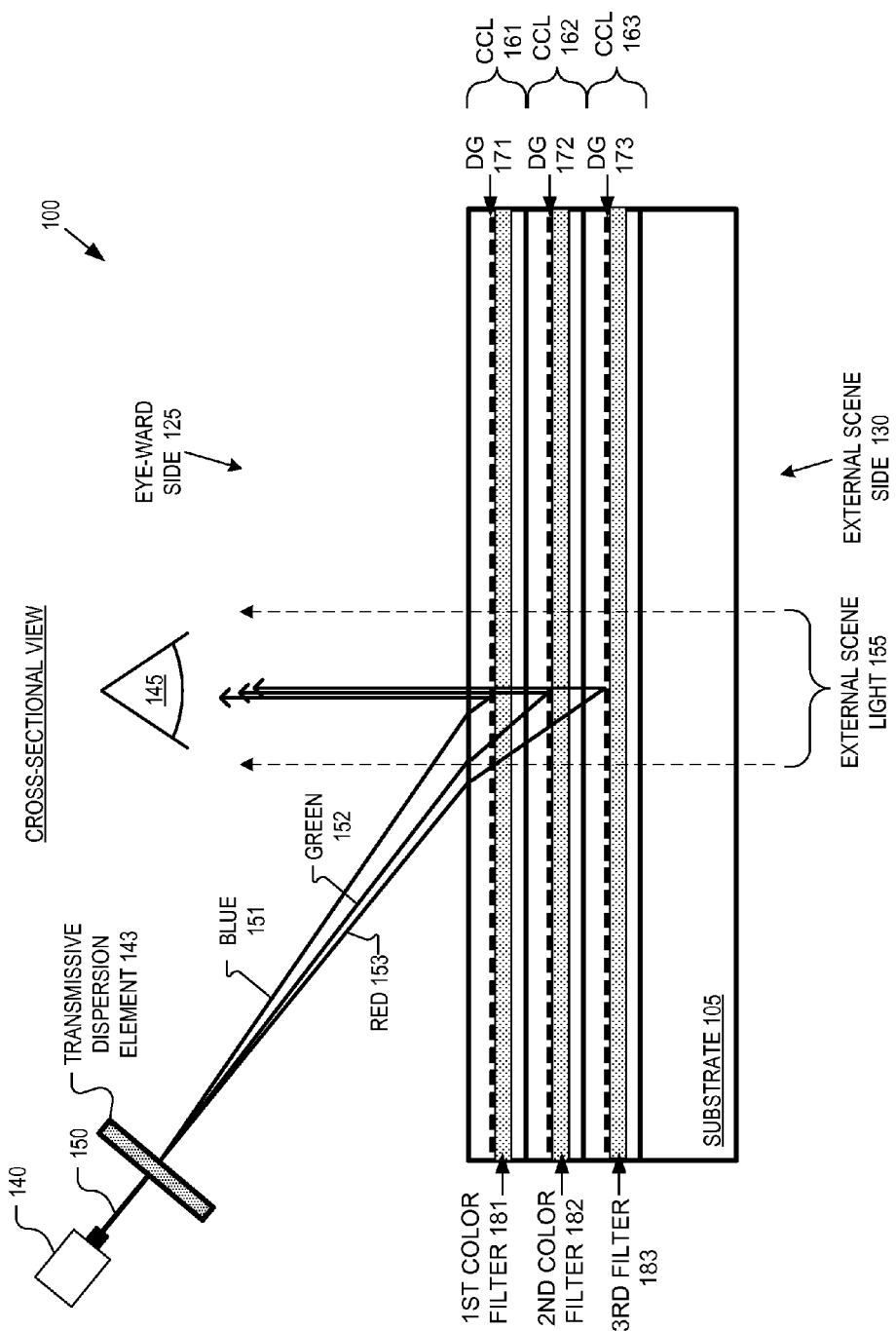
FIG. 1 is a system level cross sectional view of a diffractive optical combiner that includes three color combiner layers, in accordance with an embodiment of the disclosure.

FIG. 1 is a system level cross sectional view of a diffractive optical combiner 100 for combining image light 150 and external scene light 155, in accordance with an embodiment of the disclosure. The illustrated embodiment of diffractive optical combiner 100 includes a substrate 105, a first color combiner layer ("CCL") 161, a second CCL 162, a third CCL 163, an eye-ward side 125, and an external scene side 130. First CCL 161 includes a first diffractive grating 171 coated with a first color filter 181, second CCL 162 includes a second diffractive grating 172 coated with a second color filter 182, and third CCL 163 includes a third diffractive grating 173 coated with a third filter 183. Each diffractive grating 171, 172, and 173 is embedded (i.e. sandwiched between) in a transparent, index-matched material 133.

The different layers of diffractive optical combiner 100 may be fabricated using a variety of clear optically transmissive materials (e.g. plastics, acrylic, thermo-plastics, polymethyl-metha-crylate (PMMA), ZEONEX—E48R, glass, quartz, etc.). In one embodiment, substrate 105 and index matched material 133 are plastic. In another embodiment, substrate 105 is glass while index matched material 133 is fabricated of silicon dioxide. Of course, other material combinations may be used.

Image source 140 is positioned on the same side of diffractive optical combiner 100 as the user's eye 145 (e.g. eye-ward side 125). Image source 140 is positioned at an angle to project image light 150 onto diffractive optical combiner 100. Image source 140 may include a variety of compact image source technologies that are used in various micro-displays and pico-projectors such as liquid crystal on silicon ("LCOS") displays, backlit liquid crystal displays, organic light emitting diode ("OLED") displays, quantum dot array displays, light emitting diode ("LED") arrays, or otherwise. CRT tubes are still used in HUDs today, but are less likely to be used in smaller devices such as see-through Head Mounted Displays (HMDs).

In some of the above technologies, image source 140 may include LEDs either as backlights or on the pixel level. In one embodiment, three different colors of LEDs combine to form the image light. In one embodiment, a red-green-blue ("RGB") LED configuration is used. As an example, red LED(s) may have a dominant wavelength near 625 nm, the green LED(s) may have a dominant wavelength near 530 nm, and the blue LED(s) may have a dominant wavelength near 470 nm. The total spectral emission of each LED may be concentrated within approximately 25 nm of each of the dominant wavelengths, meaning each LED emits a majority of its light (e.g. full width at half maximum "FWHM") within a 50 nm bandwidth.

In some of the above technologies, image source 140 may include a light source that includes lasers emitting three different colors of light. The three different colors of light may be red, green, and blue. Each color of laser light may have a bandwidth of approximately 0.1 nm.

Figure 2:
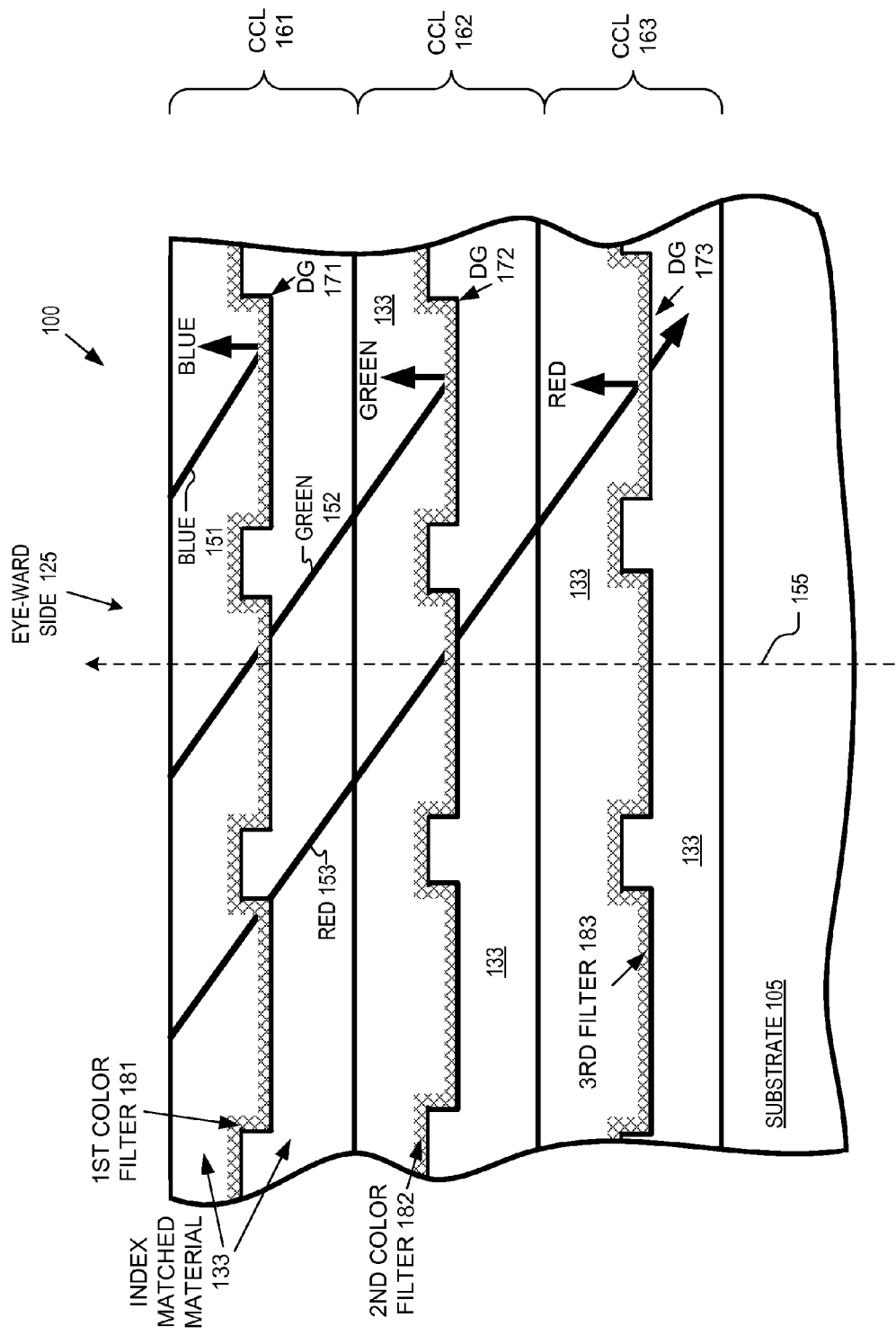
FIG. 2 is a zoomed in cutout of a portion of a diffractive optical combiner, in accordance with an embodiment of the disclosure.

FIG. 2 is a zoomed in cutout of a portion of diffractive optical combiner 100, in accordance with an embodiment of the disclosure. In the illustrated embodiment, filters 181, 182, and 183 coat their respective diffractive gratings 171, 172, and, 173. In the illustrated embodiment, filters 181 and 182 are reflective color filters that reflect blue and green light, respectively. In one embodiment, color filters 181, 182 are reflective bandpass filters and substantially reflect light in selected frequencies. Third filter 183 may partially reflect visible light. For example, third filter 183 may be a partially reflective (e.g. a 50/50 beam splitter) and partially transmissive filter. An aluminum or chromium dioxide ($CrO_2$) layer of less than 100 nm may be disposed on diffractive grating 173 to form the partially reflective and partially transmissive filter. In another example of partially reflecting visible light, third filter 183 reflects red light and transmits non-red visible light. Third filter 183 may be a bandpass filter that reflects red light. Filters 181, 182, and 183 can be configured to reflect different colors of light than the given example.

As image light 150 reaches first color filter 183 of first CCL 161, first color filter 181 reflects a blue component 151 of image light 150. In one embodiment, first color filter 181 reflects a 50 nm band that corresponds with a blue LED emission from blue LED(s) in a light source (or blue LED pixels) of the image source 140. In another embodiment, first color filter 181 reflects a 0.1 nm band that corresponds with a blue laser emission from blue laser(s) in a light source of the image source 140. Of course, first color filter 181 may reflect different bandwidths than these examples. Since first color filter 181 is disposed on the structure of diffractive grating 171, blue component 151 of image light 150 is affected by the diffractive properties of diffractive grating 171.

First diffractive grating 171 is configured to receive image light 150 from image source 140 and reflect (using first color filter 181) blue light at an order of diffraction that directs the blue light in a direction substantially normal to eye 145, in order to present images to the user. To accomplish this reflection, diffractive grating 171 must be angled-tuned to a fixed (and known) angle that image source 140 projects from to properly direct the desired color of light into eye 145. In other words, to design diffractive grating 171, a designer must consider the desired light color to be reflected, the angle the desired light color will strike diffractive grating 171, and the required order of diffraction to direct the desired light color to enter eye 145 substantially normal. It is understood that the illustrated diffractive structure for diffractive gratings 171, 172, and 173 are purely illustrative and other diffractive structures may be used reflect image light 150 into eye 145, according to particular design variables.

In FIG. 1, it is observed that image light 150 (including blue component 151, green component 152, and red component 153) violates the law of reflection when it is reflected by the respective diffractive gratings. This is because in FIGS. 1 and 2, the diffractive gratings 171, 172, and 173 are tuned to reflect their respective light colors at an order of diffraction of negative one with the other orders suppressed. Reflecting the colors at particular orders of diffraction can facilitate directing the respective colors into eye 145 in a direction substantially normal to eye 145.

Referring to FIG. 2, because diffractive grating 171 is embedded between index matched material 133 that has the same index of refraction, colors not reflected by first color filter 181 do not "see" diffraction grating 171—it is virtually transparent to them. Consequently, colors of image light 150 not reflected by first color filter 181 continue propagating through optical combiner 100 until reaching diffractive grating 172. It may be advantageous for filters 181, 182, and 183 to be relatively thin so that any index differences between the filters and index matched material 133 minimally impacts the image light traveling through the filter disposed on the diffractive structures.

Upon reaching diffractive grating 172, second color filter 182 reflects a green component 152 of image light 150. In one embodiment, second color filter 182 reflects a 50 nm band that corresponds with a green LED emission from green LED(s) in a light source (or green LED pixels) of the image source 140. In another embodiment, second color filter 182 reflects a 0.1 nm band that corresponds with a green laser emission from green laser(s) in a light source of the image source 140. Of course, second color filter 182 may reflect different bandwidths than these examples. Since second color filter 182 is disposed on the structure of diffractive grating 172, green component 152 of image light 150 is affected by the diffractive properties of diffractive grating 172.

Similar to diffractive grating 171, diffractive grating 172 is configured to receive image light 150 from image source 140 and reflect (using second color filter 182) green light at an order of diffraction that directs the green light in a direction substantially normal to eye 145, in order to present images to the user. Second diffractive grating 172 is angled-tuned to the angle that image source 140 is positioned to properly direct green component 152 into eye 145.

Colors of image light 150 not reflected by first color filter 181 and not reflected by second color filter 182 travel through diffraction grating 172 as it is virtually transparent because of indexed matched material 133. In the illustrated embodiment, third filter 183 is a partially reflective, partially transmissive filter. In one embodiment, third filter 183 is a 50/50 reflective filter that reflects half of incident light and transmits the other half of incident light. Since image light 150 may consist of blue, green, and red light components 151, 152, and 153, substantially all of image light 150 except red light component 153 may have been already reflected by the first and second diffractive gratings. Consequently, third filter 183 may simply reflect half of red light component 153. Any non-red light that travels to diffraction grating 173 may simply follow the laws of reflection (reflecting generally other-than-normal-to eye 145) or be otherwise scattered. Half of red component 153 may pass through third diffractive grating 173, while the other half is reflected substantially normal to eye 145 as diffractive grating 173 is tuned to diffract red light 153 in an order of diffraction that directs red light 153 substantially normal to eye 145.

Third filter 183 may be a bandpass filter tuned to reflect red light. In one embodiment, third filter 183 reflects a 50 nm band that corresponds with a red LED emission from red LED(s) in a light source of the image source 140. In another embodiment, third filter 183 reflects a 0.1 nm band that corresponds with a red laser emission from red laser(s) in a light source (or red LED pixels) of the image source 140. Of course, third filter 183 may reflect different bandwidths than these examples.

If third filter 183 is a bandpass filter tuned to reflect red light 153, non-red light that was not reflected by first and second color filters 181 and 182 will simply pass through CCL 163 and through substrate 105. Red light 153 reflected by the red bandpass filter will be reflected substantially normal to eye 145 as diffractive grating 173 is tuned to diffract red light 153 in an order of diffraction that directs red light 153 substantially normal to eye 145.

It may be advantageous to use a 50/50 reflective filter instead of a bandpass filter for third filter 183 to protect the color integrity of external scene light 155 that must travel through diffractive optical combiner 100 in order to reach eye 145. Optical combiner 100 is meant to combine CGI images from image source 140 with real scene images in the user's environment. Using reflective bandpass filters within optical combiner 100 effectively removes those colors from external scene light 155, which can cause a perceptible color shift of scene images. Hence, by using a 50/50 reflective optic for third filter 183, diffractive grating 173 can still reflect half of red component 153, while still letting half of the red light from external scene 155 propagate to eye 145. Image source 140 may be modified to include twice as much red light 153 in image light 150 in order to account for a 50/50 reflective optic.

On the note of potential color shifts in external scene light 155, it may be advantageous to narrow the bandwidth of the bandpass filters 181, 182, and 183, if filter 183 is a bandpass. The narrower the color bandwidth reflected, the lower amount of color shift the user will perceive. To keep the bandwidth of reflective filters 181, 182, and 183 low, LED light sources may be filtered to emit narrower light spectrum signatures than unfiltered LEDs normally would to allow reflective filters 181, 182, and 183 to also narrow their bandpass bandwidths, which would in turn reduce the color shift of external scene light 155. Color purity of saturation may also improve with narrower bandwidths of blue, green, and red light components 151, 152, and 153. Diffractive gratings 171, 172, and 173 may also be more precisely tuned to direct their respective colors of light if the blue, green, and red light components 151, 152, and 153 have narrower bandwidths.

If blue, green, and red lasers are used as a light source in image source 140, blue, green, and red light components 151, 152, and 153 may have very small wavelength bandwidths (e.g. less than 1 nm). In this case, first, second, and third filters 181, 182, and 183 may be tuned to reflect very narrow bandwidths of image light 150. Reflecting small bandwidths of image light 150 may be advantageous because external scene light 155 propagating toward eye 145 would have very small bandwidths removed by filters 181, 182, and 183. With less than 1 nm bandwidths removed from external scene light 155, eye 145 would likely detect little to no color shift compared to viewing external scene light 155 without optical combiner 100.

Referring back to FIG. 1, a transmissive dispersion element ("TDE") 143 is disposed between image source 140 and optical combiner 100. In one embodiment, TDE 143 includes a transmissive diffractive grating. In one embodiment, TDE 143 is fixed to image source 140. In another embodiment, TDE 143 is disposed on first CCL 161. TDE 143 is configured to disperse image light 150 into first, second, and third color light at angles that position-correct the first, second, and third color light to enter eye 145 in a same relative location (e.g. a pixel location) as the image light entered TDE 143. In the illustrated embodiment, the first, second, and third color lights are blue, green, and red components 151, 152, and 153. The angles for the different colors of light depend on a mounting angle of image source 140 relative to first CCL 161. The angles for the different color light also depend on the thicknesses and the refractive index of first, second, and third CCLs 161, 162, and 163.

Without TDE element 143, a pixel in an image within image light 150 may have a blue, green, and red component. However, if each of the blue, green, and red components of that pixel became incident on first CCL 161 at essentially the same location, the green and red components would travel a longer distance to be reflected by second CCL 162 and third CCL 163, respectively. The longer travel distance would cause the green and red components to exit first CCL 161 (after being reflected by CCLs 162 and 163) at different locations. Consequently, the blue, green, and red components of the original pixel of image light 150 would be in different positions when they propagate toward eye 145. Therefore, in FIG. 1, TDE element 143 is configured to separate out the blue, green, and red components and direct them toward optical combiner 100 at angles that will position-correct the color components to exit at essentially the same location, which preserves the color integrity of each pixel in image light 150. In other words, the different light components may enter first CCL 161 at different relative locations in order to exit first CCL 161 at essentially the same location so that the image integrity is preserved upon presentation to eye 145.

Figure 3:
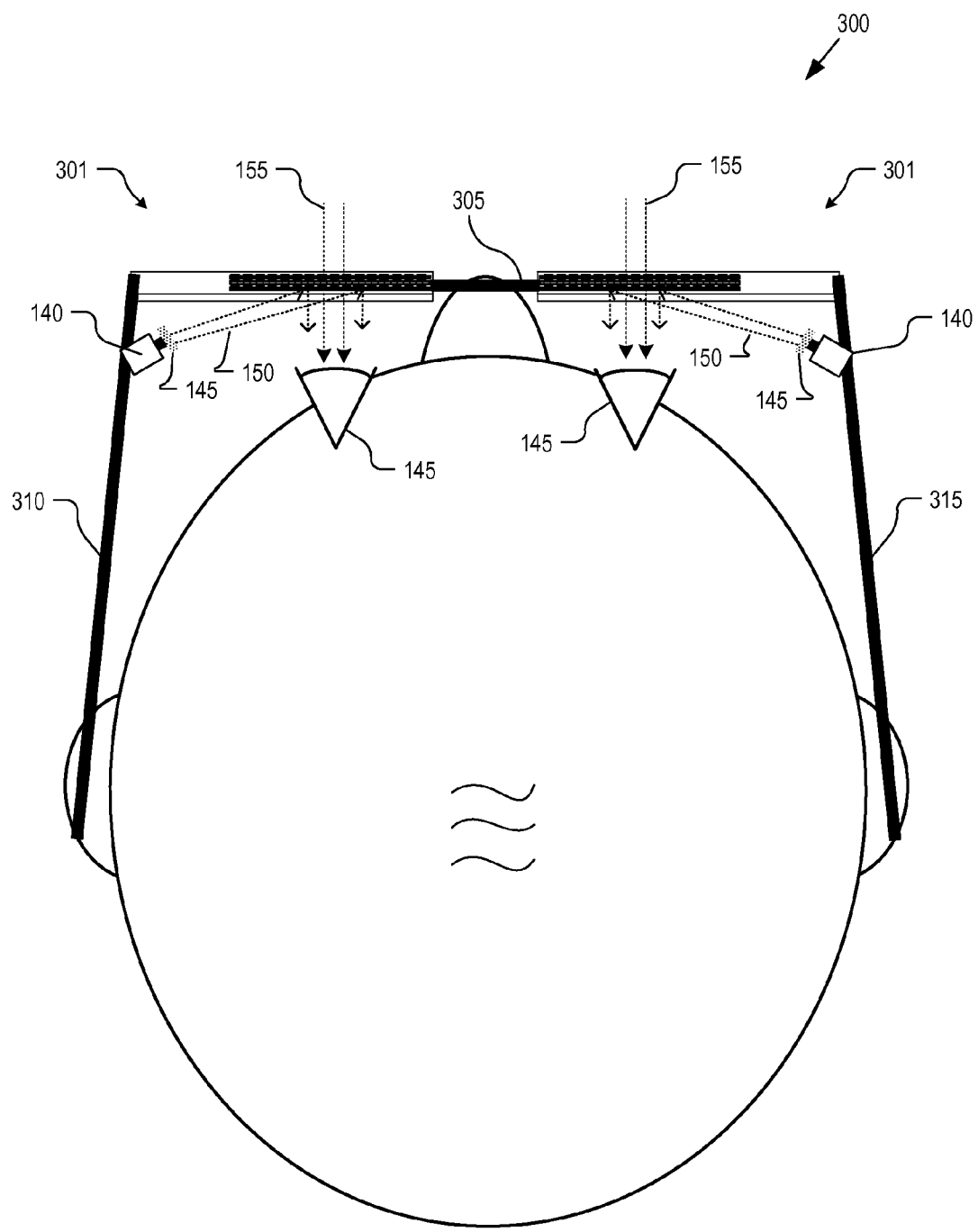
FIG. 3 is a top view of a binocular head mounted display using two diffractive optical combiners, in accordance with an embodiment of the disclosure.

FIG. 3 is a top view of a binocular head mounted display ("HMD") 300 using two diffractive optical combiners 301, in accordance with an embodiment of the disclosure. Each diffractive optical combiner 301 may be implemented with an embodiment of diffractive optical combiner 100. The optical combiners 301 are mounted to a frame assembly, which includes a nose bridge 305, left ear arm 310, and right ear arm 315. Although FIG. 3 illustrates a binocular embodiment, HMD 300 may also be implemented as a monocular HMD.

In the illustrated embodiment, the two optical combiners 301 are secured into an eyeglass arrangement that can be worn on the head of a user. The left and right ear arms 310 and 315 rest over the user's ears while nose assembly 305 rests over the user's nose. The frame assembly is shaped and sized to position each optical combiner 301 in front of a corresponding eye 145 of the user. Of course, other frame assemblies having other shapes may be used (e.g., a visor with ear arms and a nose bridge support, a single contiguous headset member, a headband, goggles type eyewear, etc.).

The illustrated embodiment of HMD 300 is capable of displaying an augmented reality to the user. Each optical combiner 301 permits the user to see a real world image via external scene light 155. Left and right (binocular embodiment) image light 150 may be generated by image sources 140 mounted to left and right ear arms 310 and 315. Image light 150 is seen by the user as a virtual image superimposed over the real world as an augmented reality. In some embodiments, external scene light 155 may be blocked or selectively blocked to provide sun-shading characteristics and increase the contrast of image light 150.

Figure 4:
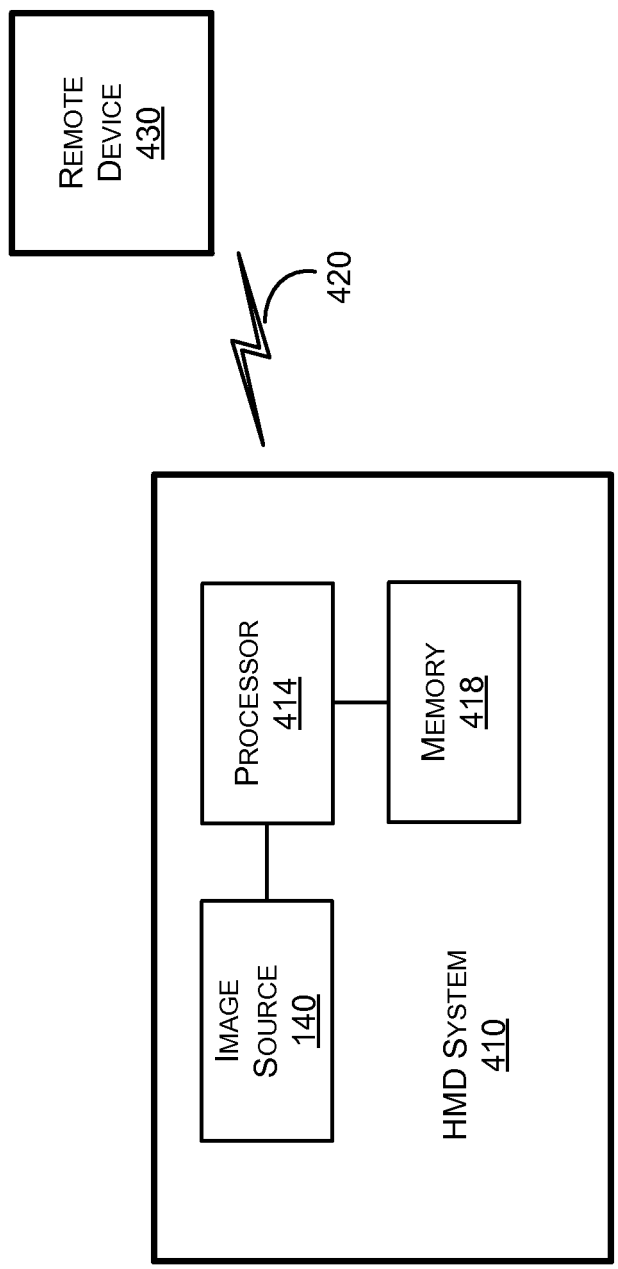
FIG. 4 is a simplified block diagram of an HMD control system that communicates to a remote device, in accordance with an embodiment of the disclosure.

FIG. 4 is a simplified block diagram of an HMD control system 410 that communicates to a remote device 430, in accordance with an embodiment of the disclosure. HMD control system 410 may be disposed within HMD 300. In an example embodiment, HMD control system 410 communicates using a communication link 420 (e.g., a wired or wireless connection) to a remote device 430.

Thus, HMD control system 410 may include image source 140, processor 414, and memory 418. The processor 414 may receive data from the remote device 430, and configure the data for display with image source 140. The processor 414 may be any type of processor, such as a microprocessor or a digital signal processor, for example.

HMD control system 410 may further include on-board data storage, such as memory 418 coupled to the processor 414. The memory 418 may store software that can be accessed and executed by the processor 414, for example.

The remote device 430 may be any type of computing device or transmitter including a laptop computer, a mobile telephone, or tablet computing device, etc., that is configured to transmit data to HMD control system 410. Remote device 430 and HMD control system 410 may contain hardware to enable the communication link 420, such as processors, transmitters, receivers, antennas, etc.

Further, remote device 430 may take the form of or be implemented in a computing system that is in communication with and configured to perform functions on behalf of a client device, such as HMD control system 410. Such a remote device 430 may receive data from another HMD control system 410, perform certain processing functions on behalf of HMD control system 410, and then send the resulting data back to HMD control system 410. This functionality may be referred to as "cloud" computing.

In FIG. 4, communication link 420 is illustrated as a wireless connection; however, wired connections may also be used. For example, the communication link 420 may be a wired serial bus such as a universal serial bus or a parallel bus. A wired connection may be a proprietary connection as well. The communication link 420 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 430 may be accessible via the Internet and may include a computing cluster associated with a particular web service (e.g., social-networking, photo sharing, address book, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical combiner having an eye-ward side and an external scene side, the optical combiner comprising:
    a first color combiner layer ("CCL") including a first diffractive grating coated with a first filter configured to reflect a first color light and pass a second and a third color light;
    a second CCL including a second diffractive grating coated with a second filter configured to reflect the second color light and pass the third color light; and
    a third CCL including a third diffractive grating coated with a third filter configured to partially reflect visible light, wherein the first, second, and third diffractive gratings are each embedded in an index matched material and are angle-tuned diffractive gratings configured to receive image light at an angle and respectively reflect the first, second, and third color light in the image light at an order of diffraction that directs the first, second, and third color light in a direction substantially normal to an eye of a user to present images to the user, and wherein the index matched material is disposed between the first filter and the second filter and the index matched material is also disposed between the second filter and the third filter.

2. The optical combiner of claim 1 further comprising a transmissive dispersion element ("TDE") disposed between the first CCL and an image source of the image light, the TDE configured to disperse the image light into the first, second, and third color light at angles that position-correct the first, second, and third color light entering the eye of the user in a same relative location as the image light entered the TDE, the angles that position-correct the first, second, and third color light depending on a mounting angle of the image source relative to the first CCL and depending on thicknesses of the first, second, and third CCLs.

3. The optical combiner of claim 2, wherein the TDE includes a diffractive grating.

4. The optical combiner of claim 1 further comprising a transparent substrate disposed on the external scene side of the optical combiner.

5. The optical combiner of claim 1, wherein the first filter is a bandpass filter and the second filter is a bandpass filter.

6. The optical combiner of claim 1, wherein the first color light has a shorter wavelength than the second color light and the second color light has a shorter wavelength than the third color light.

7. The optical combiner of claim 1, wherein an image source emits the image light and the image source has a light source including a first color LED emitting the first color light, a second color LED emitting the second color light, and a third color LED emitting the third color light, and wherein the first and second filters are respectively configured to substantially reflect a full width at half maximum ("FWHM") bandwidth of emissions of the first and second color LEDs.

8. The optical combiner of claim 7, wherein the third filter is a beam splitter reflecting a percentage of visible light and a brightness level of the third color LED corresponds to the percentage of visible light reflected by the third filter.

9. The optical combiner of claim 1, wherein the first filter is a first bandpass filter, the second filter is a second bandpass filter, and the third filter is a third bandpass filter.

10. The optical combiner of claim 9, wherein an image source emits the image light and the image source has a light source that includes lasers emitting at least the first, second, and third color light and the first, second, and third bandpass filters are narrowly tuned to respectively reflect the first, second, and third color light while not creating a perceivable color shift of the external scene light to the eye of the user.

11. A head mounted display ("HMD") that combines image light with external scene light, the HMD comprising:
    an image source to generate the image light including first, second, and third color light;
    an optical combiner including a first color combiner layer ("CCL") including a first diffractive grating coated with a first filter configured to reflect the first color light and pass the second and third color light, a second CCL including a second diffractive grating coated with a second filter configured to reflect the second color light, and pass the third color light, and a third CCL including a third diffractive grating coated with a third filter configured to partially reflect visible light;
    a frame assembly for wearing on a head of a user, the frame assembly supporting the image source and positioning the optical combiner in front of an eye of the user; and
    a transmissive dispersion element ("TDE") positioned between the image source and the optical combiner, the TDE configured to diffract the image light into the first, second, and third color light at angles, wherein the first, second, and third diffractive gratings are each embedded in an index matched material and are angle-tuned diffractive gratings configured to respectively reflect the first, second, and third color light received from the TDE at an order of diffraction that directs the first, second, and third color light in a direction substantially normal to an eye of a user of the HMD, and wherein the index matched material is disposed between the first filter and the second filter and the index matched material is also disposed between the second filter and the third filter.

12. The HMD of claim 11, wherein the TDE is configured to diffract the image light into the first, second, and third color light at angles that position-correct the first, second, and third color light entering the eye of the user in a same relative location as the image light entered the TDE, the angles that position-correct the first, second, and third color light depending on a mounting angle of the image source relative to the first CCL and depending on thicknesses of the first, second, and third CCLs.

13. The HMD of claim 11, wherein the TDE includes a diffractive grating.

14. The HMD of claim 11, wherein the first filter is a bandpass filter and the second filter is a bandpass filter.

15. The HMD of claim 11, wherein the first color light has a shorter wavelength than the second color light and the second color light has a shorter wavelength than the third color light.

16. The HMD of claim 11, wherein the image source has a light source including a first color LED emitting the first color light, a second color LED emitting the second color light, and a third color LED emitting the third color light.

17. The HMD of claim 16, wherein the third filter is a beam splitter reflecting a percentage of visible light and a brightness level of the third color LED corresponds to the percentage of visible light reflected by the third filter.

18. The HMD of claim 11, wherein the image source includes a light source that includes lasers emitting at least the first, second, and third color light.

19. The HMD of claim 11, wherein the optical combiner includes a transparent substrate disposed on an external scene side of the HMD.

20. The HMD of claim 11 further comprising an HMD control system circuitry that includes an antenna to wirelessly receive media content from remote devices, a processor coupled to the antenna, wherein the image source is coupled to the processor to receive media content to display to the eye of the user.

* * * * *